US 9,195,608 B2

(12) United States Patent
Friedlander et al.

(10) Patent No.: US 9,195,608 B2
(45) Date of Patent: Nov. 24, 2015

(54) STORED DATA ANALYSIS

(71) Applicant: INTERNATIONAL BUSINESS MACHINES CORPORATION, Armonk, NY (US)

(72) Inventors: Robert R. Friedlander, Southbury, CT (US); James R. Kraemer, Santa Fe, NM (US); David M. Ungar, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 13/896,461

(22) Filed: May 17, 2013

(65) Prior Publication Data

US 2014/0344548 A1 Nov. 20, 2014

(51) Int. Cl.
*G06F 12/10* (2006.01)
*G06F 12/02* (2006.01)

(52) U.S. Cl.
CPC ............ *G06F 12/1018* (2013.01); *G06F 12/10* (2013.01); *G06F 12/023* (2013.01)

(58) Field of Classification Search
CPC .................................................. G06F 12/1018
USPC ........................................................ 711/206
See application file for complete search history.

(56) References Cited

U.S. PATENT DOCUMENTS

| 5,450,535 A | 9/1995 | North |
| 5,664,179 A | 9/1997 | Tucker |
| 5,689,620 A | 11/1997 | Kopec et al. |
| 5,701,460 A | 12/1997 | Kaplan et al. |
| 5,943,663 A | 8/1999 | Mouradian |

(Continued)

FOREIGN PATENT DOCUMENTS

| EP | 1566752 A2 | 8/2005 |
| EP | 1843259 A2 | 10/2007 |

(Continued)

OTHER PUBLICATIONS

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

(Continued)

*Primary Examiner* — Cheng-Yuan Tseng
*Assistant Examiner* — Zubair Ahmed
(74) *Attorney, Agent, or Firm* — John R. Pivnichny; Law Office of Jim Boice

(57) ABSTRACT

A system comprises a hashing logic, which executes instructions to convert raw data into a first logical address and payload data, where the first logical address describes metadata about the payload data. A hardware translation unit executes instructions to translate the first logical address into a first physical address on a storage device. A hardware load/storage unit stores the first logical address and the payload data at the first physical address on the storage device. A hardware exclusive OR (XOR) unit compares two logical address vectors to derive a Hamming distance between the two logical address vectors. A hardware retrieval unit retrieves other payload data that is stored at a second physical address whose second logical address is within a predefined Hamming distance from the first logical address, thus allowing payload data from the two logical addresses to be grouped/associated with one another.

17 Claims, 5 Drawing Sheets

(56) References Cited

U.S. PATENT DOCUMENTS

| | | | |
|---|---|---|---|
| 5,974,427 A | 10/1999 | Reiter | |
| 6,199,064 B1 | 3/2001 | Schindler | |
| 6,275,833 B1 | 8/2001 | Nakamura et al. | |
| 6,314,555 B1 | 11/2001 | Ndumu et al. | |
| 6,334,156 B1 | 12/2001 | Matsuoka et al. | |
| 6,381,611 B1 | 4/2002 | Roberge et al. | |
| 6,405,162 B1 | 6/2002 | Segond et al. | |
| 6,424,969 B1* | 7/2002 | Gruenwald | 707/802 |
| 6,553,371 B2 | 4/2003 | Gutierrez-Rivas et al. | |
| 6,633,868 B1 | 10/2003 | Min et al. | |
| 6,735,593 B1 | 5/2004 | Williams | |
| 6,768,986 B2 | 7/2004 | Cras et al. | |
| 6,925,470 B1 | 8/2005 | Sangudi et al. | |
| 6,990,480 B1 | 1/2006 | Burt | |
| 7,058,628 B1 | 6/2006 | Page | |
| 7,103,836 B1 | 9/2006 | Nakamura et al. | |
| 7,209,923 B1 | 4/2007 | Cooper | |
| 7,337,174 B1 | 2/2008 | Craig | |
| 7,441,264 B2 | 10/2008 | Himmel et al. | |
| 7,493,253 B1 | 2/2009 | Ceusters et al. | |
| 7,523,118 B2 | 4/2009 | Friedlander et al. | |
| 7,523,123 B2 | 4/2009 | Yang et al. | |
| 7,571,163 B2 | 8/2009 | Trask | |
| 7,702,605 B2 | 4/2010 | Friedlander et al. | |
| 7,748,036 B2 | 6/2010 | Speirs, III et al. | |
| 7,752,154 B2 | 7/2010 | Friedlander et al. | |
| 7,778,955 B2 | 8/2010 | Kuji | |
| 7,783,586 B2 | 8/2010 | Friedlander et al. | |
| 7,788,202 B2 | 8/2010 | Friedlander et al. | |
| 7,788,203 B2 | 8/2010 | Friedlander et al. | |
| 7,792,774 B2 | 9/2010 | Friedlander et al. | |
| 7,792,776 B2 | 9/2010 | Friedlander et al. | |
| 7,792,783 B2 | 9/2010 | Friedlander et al. | |
| 7,797,319 B2 | 9/2010 | Piedmonte | |
| 7,805,390 B2 | 9/2010 | Friedlander et al. | |
| 7,805,391 B2 | 9/2010 | Friedlander et al. | |
| 7,809,660 B2 | 10/2010 | Friedlander et al. | |
| 7,853,611 B2 | 12/2010 | Friedlander et al. | |
| 7,870,113 B2 | 1/2011 | Gruenwald | |
| 7,877,682 B2 | 1/2011 | Aegerter | |
| 7,925,610 B2 | 4/2011 | Elbaz et al. | |
| 7,930,262 B2 | 4/2011 | Friedlander et al. | |
| 7,940,959 B2 | 5/2011 | Rubenstein | |
| 7,953,686 B2 | 5/2011 | Friedlander et al. | |
| 7,970,759 B2 | 6/2011 | Friedlander et al. | |
| 7,996,393 B1 | 8/2011 | Nanno et al. | |
| 8,032,508 B2 | 10/2011 | Martinez et al. | |
| 8,046,358 B2 | 10/2011 | Thattil | |
| 8,055,603 B2 | 11/2011 | Angell et al. | |
| 8,069,188 B2 | 11/2011 | Larson et al. | |
| 8,086,614 B2 | 12/2011 | Novy | |
| 8,095,726 B1* | 1/2012 | O'Connell et al. | 711/108 |
| 8,145,582 B2 | 3/2012 | Angell et al. | |
| 8,150,882 B2 | 4/2012 | Meek et al. | |
| 8,155,382 B2 | 4/2012 | Rubenstein | |
| 8,161,048 B2 | 4/2012 | Procopiuc et al. | |
| 8,199,982 B2 | 6/2012 | Fueyo et al. | |
| 8,234,285 B1 | 7/2012 | Cohen | |
| 8,250,581 B1 | 8/2012 | Blanding et al. | |
| 8,341,626 B1 | 12/2012 | Gardner et al. | |
| 8,447,273 B1 | 5/2013 | Friedlander et al. | |
| 8,457,355 B2 | 6/2013 | Brown et al. | |
| 8,620,958 B1 | 12/2013 | Adams et al. | |
| 8,799,323 B2 | 8/2014 | Nevin, III | |
| 8,849,907 B1 | 9/2014 | Hession et al. | |
| 2002/0091677 A1 | 7/2002 | Sridhar | |
| 2002/0111792 A1 | 8/2002 | Cherny | |
| 2002/0184401 A1 | 12/2002 | Kadel et al. | |
| 2003/0065626 A1 | 4/2003 | Allen | |
| 2003/0088576 A1 | 5/2003 | Hattori et al. | |
| 2003/0149562 A1 | 8/2003 | Walther | |
| 2003/0149934 A1 | 8/2003 | Worden | |
| 2003/0212851 A1 | 11/2003 | Drescher et al. | |
| 2004/0111410 A1 | 6/2004 | Burgoon et al. | |
| 2004/0153461 A1 | 8/2004 | Brown et al. | |
| 2004/0162838 A1 | 8/2004 | Murayama et al. | |
| 2004/0249789 A1 | 12/2004 | Kapoor et al. | |
| 2005/0050030 A1 | 3/2005 | Gudbjartsson et al. | |
| 2005/0165866 A1 | 7/2005 | Bohannon et al. | |
| 2005/0181350 A1 | 8/2005 | Benja-Athon | |
| 2005/0222890 A1 | 10/2005 | Cheng et al. | |
| 2005/0273730 A1 | 12/2005 | Card et al. | |
| 2006/0004851 A1 | 1/2006 | Gold et al. | |
| 2006/0036568 A1 | 2/2006 | Moore et al. | |
| 2006/0190195 A1 | 8/2006 | Watanabe et al. | |
| 2006/0197762 A1 | 9/2006 | Smith et al. | |
| 2006/0200253 A1 | 9/2006 | Hoffberg et al. | |
| 2006/0256010 A1 | 11/2006 | Tanygin et al. | |
| 2006/0271586 A1 | 11/2006 | Federighi et al. | |
| 2006/0290697 A1 | 12/2006 | Madden et al. | |
| 2007/0006321 A1 | 1/2007 | Bantz et al. | |
| 2007/0016614 A1 | 1/2007 | Novy | |
| 2007/0038651 A1 | 2/2007 | Bernstein et al. | |
| 2007/0067343 A1 | 3/2007 | Mihaila et al. | |
| 2007/0073734 A1 | 3/2007 | Doan et al. | |
| 2007/0079356 A1 | 4/2007 | Grinstein | |
| 2007/0088663 A1 | 4/2007 | Donahue | |
| 2007/0130182 A1 | 6/2007 | Forney | |
| 2007/0136048 A1 | 6/2007 | Richardson-Bunbury et al. | |
| 2007/0185850 A1 | 8/2007 | Walters et al. | |
| 2007/0239710 A1 | 10/2007 | Jing et al. | |
| 2007/0282916 A1 | 12/2007 | Albahari et al. | |
| 2007/0300077 A1 | 12/2007 | Mani et al. | |
| 2008/0065655 A1 | 3/2008 | Chakravarthy et al. | |
| 2008/0066175 A1 | 3/2008 | Dillaway et al. | |
| 2008/0086442 A1 | 4/2008 | Dasdan et al. | |
| 2008/0091503 A1 | 4/2008 | Schirmer et al. | |
| 2008/0133474 A1 | 6/2008 | Hsiao et al. | |
| 2008/0159317 A1 | 7/2008 | Iselborn et al. | |
| 2008/0172715 A1 | 7/2008 | Geiger et al. | |
| 2008/0208813 A1 | 8/2008 | Friedlander et al. | |
| 2008/0208838 A1 | 8/2008 | Friedlander et al. | |
| 2008/0208901 A1 | 8/2008 | Friedlander et al. | |
| 2008/0281801 A1 | 11/2008 | Larson et al. | |
| 2008/0306926 A1 | 12/2008 | Friedlander et al. | |
| 2009/0024553 A1 | 1/2009 | Angell et al. | |
| 2009/0064300 A1 | 3/2009 | Bagepalli et al. | |
| 2009/0080408 A1 | 3/2009 | Natoli et al. | |
| 2009/0125546 A1 | 5/2009 | Iborra et al. | |
| 2009/0144609 A1 | 6/2009 | Liang et al. | |
| 2009/0164649 A1 | 6/2009 | Kawato | |
| 2009/0165110 A1 | 6/2009 | Becker et al. | |
| 2009/0177484 A1 | 7/2009 | Davis et al. | |
| 2009/0287676 A1 | 11/2009 | Dasdan | |
| 2009/0299988 A1 | 12/2009 | Hamilton, II et al. | |
| 2009/0327632 A1 | 12/2009 | Glaizel et al. | |
| 2010/0030780 A1* | 2/2010 | Eshghi et al. | 707/6 |
| 2010/0070640 A1 | 3/2010 | Allen et al. | |
| 2010/0077033 A1 | 3/2010 | Lowry | |
| 2010/0088322 A1 | 4/2010 | Chowdhury et al. | |
| 2010/0131293 A1 | 5/2010 | Linthicum et al. | |
| 2010/0169137 A1 | 7/2010 | Jastrebski et al. | |
| 2010/0169758 A1 | 7/2010 | Thomsen | |
| 2010/0174692 A1 | 7/2010 | Meyer et al. | |
| 2010/0179933 A1 | 7/2010 | Bai et al. | |
| 2010/0191743 A1 | 7/2010 | Perronnin et al. | |
| 2010/0191747 A1 | 7/2010 | Ji et al. | |
| 2010/0241644 A1 | 9/2010 | Jackson et al. | |
| 2010/0257198 A1 | 10/2010 | Cohen et al. | |
| 2010/0268747 A1 | 10/2010 | Kern et al. | |
| 2010/0274785 A1 | 10/2010 | Procopiuc et al. | |
| 2011/0040724 A1 | 2/2011 | Dircz | |
| 2011/0066649 A1 | 3/2011 | Berlyant et al. | |
| 2011/0077048 A1 | 3/2011 | Busch | |
| 2011/0087678 A1 | 4/2011 | Frieden et al. | |
| 2011/0093479 A1 | 4/2011 | Fuchs | |
| 2011/0098056 A1 | 4/2011 | Rhoads et al. | |
| 2011/0123087 A1 | 5/2011 | Nie et al. | |
| 2011/0137882 A1 | 6/2011 | Weerasinghe | |
| 2011/0194744 A1 | 8/2011 | Wang et al. | |
| 2011/0208688 A1 | 8/2011 | Ivanov et al. | |
| 2011/0246483 A1 | 10/2011 | Darr et al. | |
| 2011/0246498 A1 | 10/2011 | Forster | |
| 2011/0252045 A1 | 10/2011 | Garg et al. | |

(56) References Cited

U.S. PATENT DOCUMENTS

| | | |
|---|---|---|
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1 | 5/2012 | Siripurapu et al. |
| 2012/0131468 A1 | 5/2012 | Friedlander et al. |
| 2012/0166373 A1 | 6/2012 | Sweeney et al. |
| 2012/0191704 A1 | 7/2012 | Jones |
| 2012/0209858 A1 | 8/2012 | Lamba et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0173585 A1 | 7/2013 | Friedlander et al. |
| 2013/0191392 A1 | 7/2013 | Kumar et al. |
| 2013/0238667 A1 | 9/2013 | Carvalho et al. |
| 2013/0246562 A1 | 9/2013 | Chong et al. |
| 2013/0291098 A1 | 10/2013 | Chung et al. |
| 2013/0326412 A1 | 12/2013 | Treiser |
| 2013/0331473 A1 | 12/2013 | Motta et al. |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1 | 3/2014 | Medelyan et al. |
| 2014/0074892 A1 | 3/2014 | Adams et al. |
| 2014/0081939 A1 | 3/2014 | Adams et al. |
| 2014/0098101 A1 | 4/2014 | Friedlander et al. |
| 2014/0184500 A1 | 7/2014 | Adams et al. |
| 2014/0188887 A1 | 7/2014 | Adams et al. |
| 2014/0188915 A1 | 7/2014 | Adams et al. |
| 2014/0188960 A1 | 7/2014 | Adams et al. |
| 2014/0214865 A1 | 7/2014 | Adams et al. |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| WO | 2006086179 A2 | 8/2006 |
| WO | 2007044763 A2 | 4/2007 |

OTHER PUBLICATIONS

Evaggelio Pitoura et al., "Context in Databases", University of Ioannina, Greece, 2004, pp. 1-19.

Avinash Kaushik, "End of Dumb Tables in Web Analytics Tools! Hello: Weighted Sort", Sep. 7, 2010, www.kaushik.net, pp. 1-15.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Visual Paradigm, "DB Visual Architect 4.0 Designer's Guide: Chapter 6—Mapping Object Model to Data Model and Vice Versa", 2007, pp. 6-2-6-26.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

W. Caid et al., "Context Vector-Based Text Retrieval", Fair ISAAC Corporation, Aug. 2003, pp. 1-20.

K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.

U.S. Appl. No. 13/342,305, Friedlander et al.—Specification Filed Jan. 3, 2012.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

A. Birrell et al., "A design for high-performance flash disks." ACM SIGOPS Operating Systems Review 41.2 (2007), pp. 88-93.

N. Saxena et al., "Data remanence effects on memory-based entropy collection for RFID systems", International Journal of Information Security 10.4 (2011), pp. 213-222.

A. Jin, et al., "Biohashing: Two Factor Authentication Featuring Fingerprint Data and Tokenised Random Number," Pattern Recognition 37, Elsevier Ltd., 2004, pp. 2245-2255.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

P. Kanerva, "What We Mean When We Say "What'S the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

P. Kanerva, "Hyperdimensional Computing: An Introduction to Computing in Distributed Representation With High-Dimensional Random Vectors", Springer Science+Business Media, LLC, COGN Comput, 1, 2009, pp. 139-159.

M.J. Flynn, et al., "Sparse Distributed Memory Principles of Operation", Research Institute for Advanced Computer Science, 1989, pp. 1-60.

"Ninth New Collegiate Dictionary", Merriam-Webster Inc., 1991, pp. 77 and 242.

"The American Heritage College Dictionary", Fourth Edition, Houghton Mifflin Company, 2004, pp. 44 and 262.

U.S. Appl. No. 13/680,832—Non-Final Office Action Mailed Apr. 8, 2014.

U.S. Appl. No. 13/628,853—Notice of Allowance Mailed Mar. 4, 2014.

U.S. Appl. No. 13/540,267—Non-Final Office Action Mailed Feb. 4, 2014.

U.S. Appl. No. 13/540,230—Non-Final Office Action Mailed Jan. 30, 2014.

U.S. Appl. No. 13/540,295—Non-Final Office Action Mailed Jan. 30, 2014.

U.S. Appl. No. 13/609,710—Non-Final Office Action Mailed Jan. 27, 2014.

U.S. Appl. No. 13/342,406—Notice of Allowance Mailed Mar. 20, 2014.

U.S. Appl. No. 13/628,853—Non-Final Office Action Mailed Nov. 7, 2013.

U.S. Appl. No. 13/593,905—Notice of Allowance Mailed Oct. 25, 2013.

U.S. Appl. No. 13/595,356—Non-Final Office Action Mailed Apr. 14, 2014.

U.S. Appl. No. 13/755,623—Notice of Allowance Mailed May 27, 2014.

S. Alam et al., "Interoperability of Security-Enabled Internet of Things", Springer, Wireless Personal Communication, 2011, No. 61, pp. 567-586.

(56) References Cited

OTHER PUBLICATIONS

U.S. Appl. No. 13/648,801—Non-Final Office Action Mailed Jul. 1, 2014.
U.S. Appl. No. 13/896,506—Specification and Drawings Filed May 17, 2013.
U.S. Appl. No. 13/733,052—Non-Final Office Action mailed Sep. 18, 2014.
U.S. Appl. No. 13/861,058—Non-Final Office Action mailed Dec. 11, 2014.
U.S. Appl. No. 13/609,710—Final Office Action mailed Jul. 24, 2014.
U.S. Appl. No. 13/342,406—Non-Final Office Action Mailed Sep. 27, 2013.
U.S. Appl. No. 13/610,347—Non-Final Office Action Mailed Jul. 19, 2013.
U.S. Appl. No. 13/610,347—Notice of Allowance Mailed Aug. 19, 2013.
U.S. Appl. No. 13/592,905—Non-Final Office Action Mailed May 8, 2013.
J. Cheng et al., "Context-Aware Object Connection Discovery in Large Graphs", Data Engineering, 2009. ICDE '09. IEEE 25th International Conference on, pp. 856-867.
R. Angles et al., "Survey of Graph Database Models", ACM Computing Surveys, vol. 40, No. 1, Article 1, Feb. 2008, pp. 1-65.
U.S. Appl. No. 13/562,714, Robert R. Friedlander, et al.—Specification and Drawings Filed Jul. 31, 2012.
U.S. Appl. No. 13/755,987—Non-Final Office Action mailed Jan. 2, 2015.
U.S. Appl. No. 13/648,801—Final Office Action mailed Jan. 13, 2015.
G. Begelman et al., "Automated Tag Clustering: Improving Search and Exploration in the TagSpace", Collaborative Tagging Workshop, WWW2006, Edinburgh, Scotland, May 2006, pp. 1-29.
U.S. Appl. No. 13/621,931—Non-Final Office Action mailed Jan. 28, 2015.
U.S. Appl. No. 13/732,567—Non-Final Office Action mailed Jan. 30, 2015.
U.S. Appl. No. 14/078,135—Notice of Allowance mailed Feb. 24, 2015.
U.S. Appl. No. 13/756,051—Notice of Allowance mailed Feb. 27, 2015.
U.S. Appl. No. 13/732,567—Non-Final Office Action mailed Mar. 26, 2015.
L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).
S. Ceri et al., "Model-Driven Development of Context-Aware Web Applications", ACM, ACM Transactions on Internet Technology, 2007, (Abstract Only).
U.S. Appl. No. 13/610,523—Non-Final Office Action mailed Apr. 30, 2015.
U.S. Appl. No. 13/540,267—Non-Final Office Action mailed Jun. 4, 2015.
U.S. Appl. No. 13/609,710—Examiner's Answer mailed Jun. 9, 2015.
U.S. Appl. No. 13/780,779—Non-Final Office Action mailed Apr. 3, 2015.
U.S. Appl. No. 13/569,366—Non-Final Office Action mailed Jun. 30, 2015.

* cited by examiner

STORED DATA ANALYSIS

BACKGROUND

The present disclosure relates to the field of computers, and specifically to the use of computers when storing data. Still more particularly, the present disclosure relates to analyzing and/or evaluating stored data.

Data storage includes the storage of data that describes a particular event, entity, etc. For example, data may describe attributes of a person, place or thing, and/or data may provide details about a commercial transaction (e.g., number of items of a particular type sold at a certain store, the costs of the items, etc.). Such data is stored in a memory structure known as a database, which may be physical or virtual.

SUMMARY

In one embodiment of the present invention, a system comprises a hashing logic, which executes instructions to convert raw data into a first logical address and payload data, where the first logical address describes metadata about the payload data. A hardware translation unit executes instructions to translate the first logical address into a first physical address on a storage device. A hardware load/storage unit stores the first logical address and the payload data at the first physical address on the storage device. A hardware exclusive OR (XOR) unit compares two logical address vectors to derive a Hamming distance between the two logical address vectors. A hardware retrieval unit retrieves other payload data that is stored at a second physical address whose second logical address is within a predefined Hamming distance from the first logical address, where a Hamming distance between the first logical address and the second logical address is derived by the hardware XOR unit.

In one embodiment of the present invention, a method and/or computer program product analyzes stored data. Raw data is converted by a hashing logic into a first logical address and payload data, where the first logical address describes metadata about the payload data. A hardware translation unit translates the first logical address into a first physical address on a storage device. A hardware load/storage unit stores the first logical address and the payload data at the first physical address on the storage device. A hardware exclusive OR (XOR) unit compares a first address vector for the first logical address to a second address vector for a second logical address to derive a Hamming distance between the first and second logical addresses. A hardware retrieval unit retrieves other payload data that is stored at a second physical address whose second logical address is within a predefined Hamming distance from the first logical address, where a Hamming distance between the first logical address and the second logical address is derived by the hardware XOR unit.

DETAILED DESCRIPTION

Figure 1:
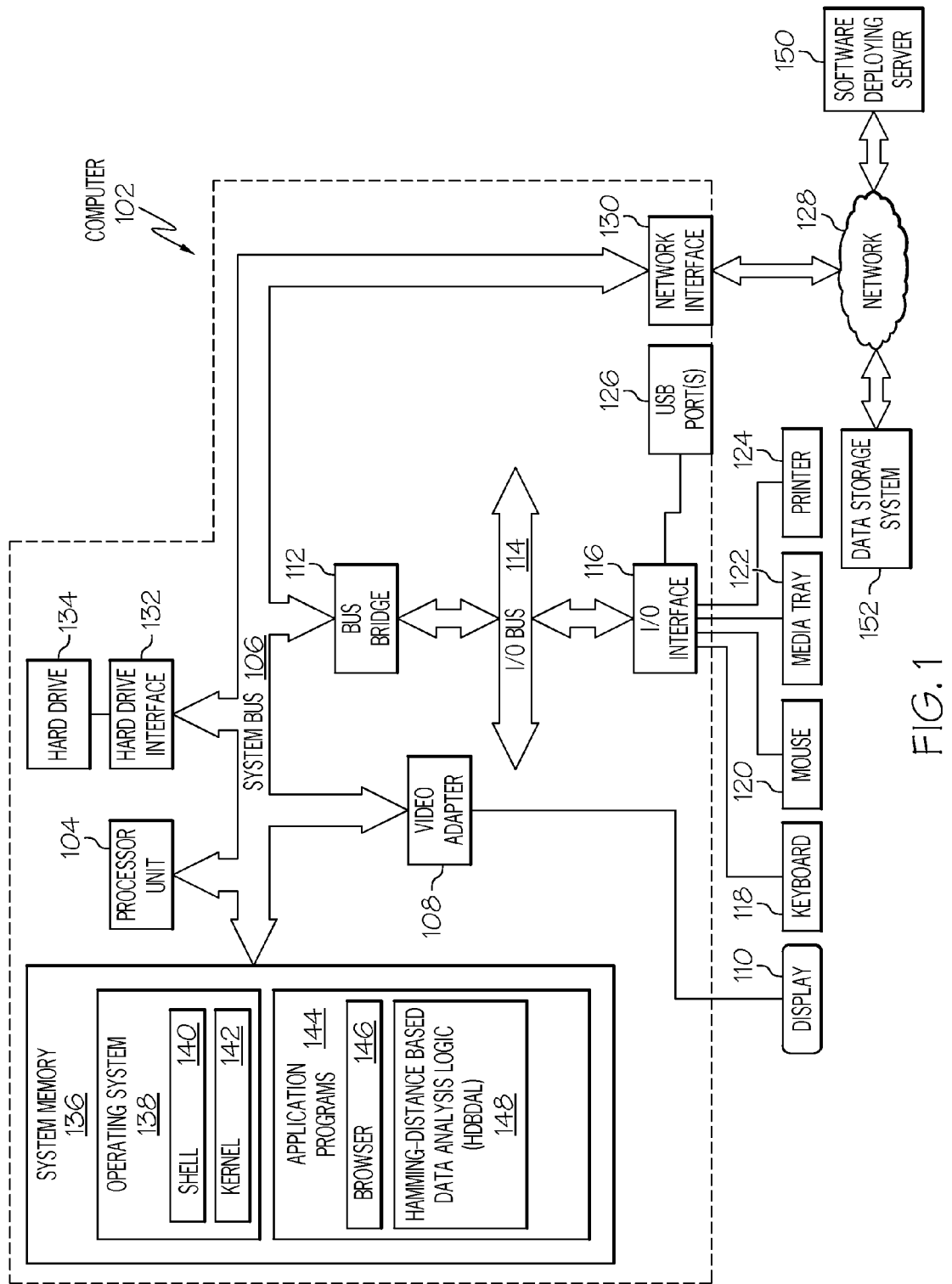
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150 and/or a data storage system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Hamming-Distance Based Data Analysis Logic (HDBDAL) 148. HDBDAL 148 includes code for implementing the processes described below, including those described in FIGS. 2-5. In one embodiment, computer 102 is able to download HDBDAL 148 from software deploying server 150, including in an on-demand basis, wherein the code in HDBDAL 148 is not downloaded until needed for execution. Note further that, in one embodiment of the present invention, software deploying server 150 performs all of the functions associated with the present invention (including execution of HDBDAL 148), thus freeing computer 102 from having to use its own internal computing resources to execute HDBDAL 148.

The data storage system 152 stores a set of data. This data may be for a particular enterprise, a particular project, a particular owner of the data, etc. As described herein, the data is stored using a logical address that describes attributes of the payload data.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like.

These and other variations are intended to be within the spirit and scope of the present invention.

Figure 2:
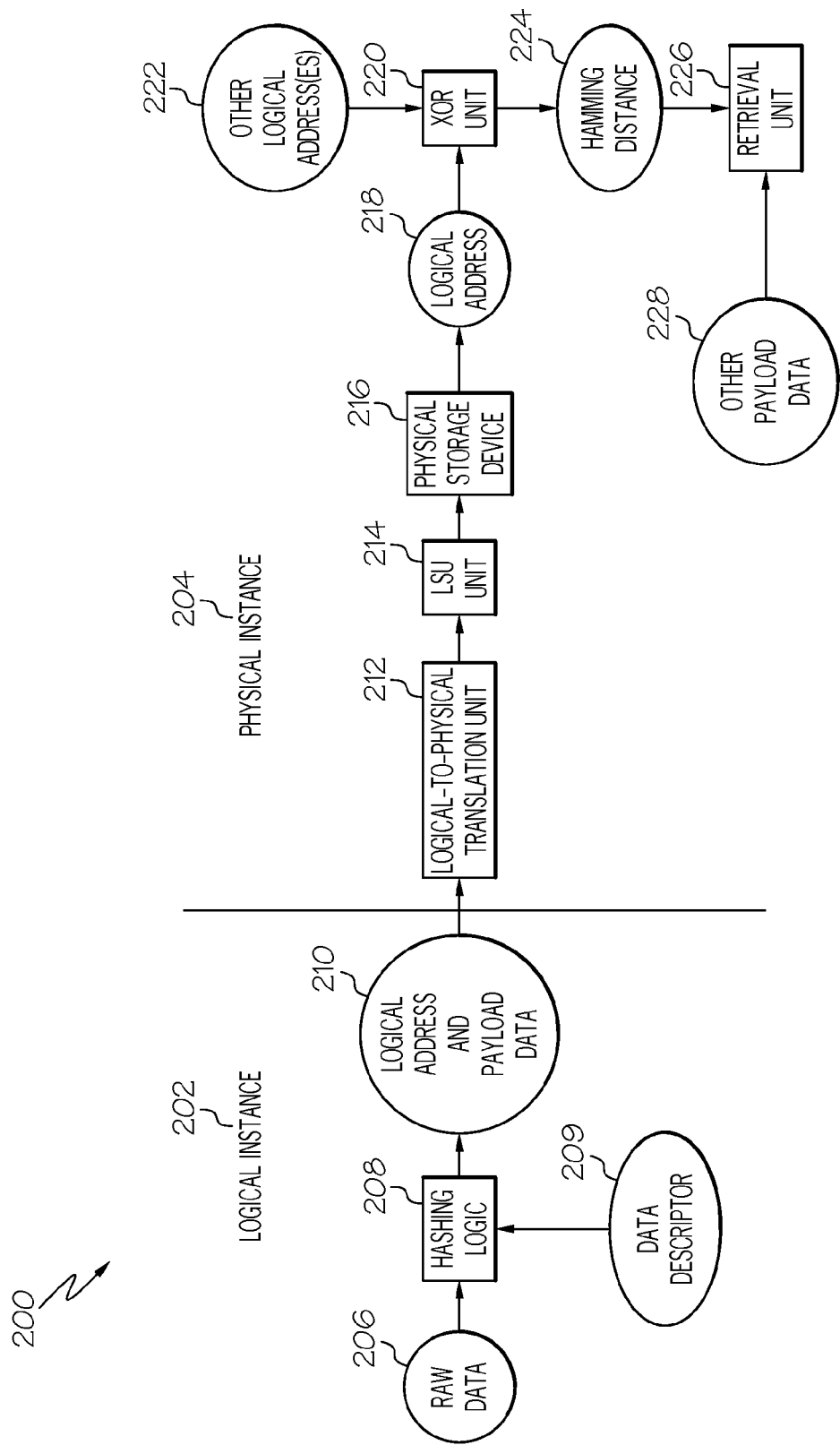
FIG. 2 illustrates an exemplary system in which data is hashed and retrieved in accordance with one embodiment of the present invention.

With reference now to FIG. 2, an exemplary system 200 in which data is hashed and retrieved in accordance with one embodiment of the present invention is presented. As depicted, system 200 comprises a logical instance 202 and a physical instance 204, in which data and addresses are depicted within circles, and processing logic is depicted within squares. The logical instance 202 includes software logic, such as hashing logic 208, which can exist purely in software, including software HDBDAL 148 that is running on a computer such as computer 102 shown in FIG. 1, or it may be a combination of software, firmware, and/or hardware in a cloud or other network of shared resources.

Physical instance 204 is made up primarily of hardware devices, such as elements 212, 214, 216, 220, and 226 depicted in FIG. 2. In one embodiment, all hardware elements depicted in physical instance 204 are on a single chip, which increases the speed of the processes described herein.

As depicted within logical instance 202, raw data 206 is first sent to a hashing logic 208. Note that while hashing logic 208 is shown as part of the logical instance 202, and thus is executed in software, in one embodiment hashing logic 208 is a dedicated hardware logic, which may be part of the physical instance 204.

The raw data 206 is data that is received from a data generator or a data source. For example, raw data 206 may be a physical measurement of heat, wind, radiation, etc.; or medical data such as medical laboratory values; or sales figures for a particular store; or sociological data describing a particular population; etc. Initially, the raw data 206 is merely a combination of characters (i.e., letters and/or numbers and/or other symbols). The hashing logic 208, however, receives information about the raw data from a data descriptor 209. Data descriptor 209 is data that describes the raw data 206. In one embodiment, data descriptor 209 is generated by the entity that generated the raw data 206. For example, if the raw data 206 are readings from a mass spectrometer in a laboratory, logic in the mass spectrometer includes self-awareness information, such as the type of raw data that this particular model of mass spectrometer generates, what the raw data represents, what format/scale is used for the raw data, etc. In another embodiment, data mining logic analyzes the raw data 206 to determine the nature of the raw data 206. For example, data mining and/or data analysis logic may examine the format of the data, the time that the data was generated, the amount of fluctuation between the current raw data and other raw data that was generated within some predefined past period (e.g., within the past 30 seconds), the format/scale of the raw data (e.g., miles per hour), and ultimately determine that the raw data is describing wind speed and direction from an electronic weather vane.

However the data descriptor 209 is derived, its purpose is to provide meaningful context to the raw data. For example, the raw data 206 may be "90". The data descriptor 209 may be "wind speed". Thus, the context of the raw data 206 is now "hurricane strength wind".

Figure 3:
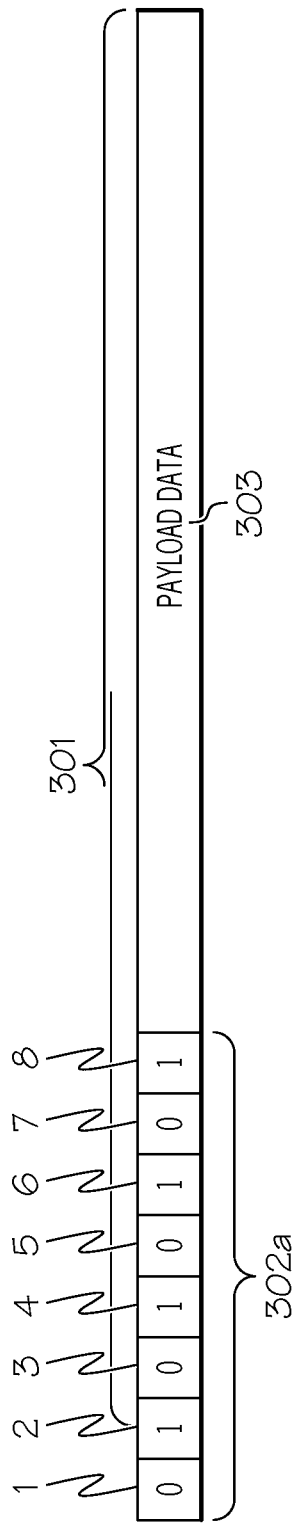
FIG. 3 presents an exemplary hashed data made up of a logical address and payload data in accordance with one embodiment of the present invention.

The hashing logic 208 utilizes the data descriptor 209 to generate a logical address at which the payload data from the raw data 206 will be stored. That is, using the data descriptor 209, the hashing logic generates a meaningful logical address that, in and of itself, describes the nature of the payload data (i.e., the raw data 206). For example, the logical address "01010101" may be reserved for hurricane strength wind readings. Thus, any data stored at an address that has "01010101" at some predefined position within the logical address (which may or may not be at the beginning of the logical address) is identified as being related to "hurricane strength wind readings". A memory storage vector describing such a logical address and payload data is shown in FIG. 3 as memory storage vector 301, which includes the logical address 302a (i.e., "01010101") and the payload data 303 (i.e., raw data 206).

As shown in FIG. 2, the logical address and payload data 210 are then sent to a logical-to-physical translation unit 212, which is hardware that translates logical addresses into physical addresses within available physical storage, such as random access memory (RAM), solid state drive (SSD) flash memory, hard disk drives, etc. This translation can be performed through the use of a lookup table, a physical address generator, or any other process known to those skilled in the art for generating physical addresses from logical addresses. (Note that a "logical address" is defined as an address at which a storage element appears to reside from the perspective of executing software, even though the "real" memory location in a physical device may be different.) The generated physical address (which was generated by the logical-to-physical translation unit 212), the logical address 218 (which was generated by the hashing logic 208), and the payload data (e.g., raw data 206) are all then sent to a load/store unit (LSU) 214, which stores the logical address 218 and the payload data in a physical storage device 216 at the generated physical address.

The logical address 218 is then sent to an exclusive OR (XOR) unit 220. XOR unit 220 is hardware logic that compares two vectors (i.e., strings of characters), and then presents a total count of how many bits at particular bit locations are different. For example, (0101) XOR (1010)=4, since the bit in each of the four bit locations is different. Similarly, (0101) XOR (0111)=1, since only the bit at the third bit location in the two vectors is different. These generated values (i.e., 4, 1) are known as "Hamming distances", which is defined as the total number of bit differences for all of the bit locations in a vector. Thus, the Hamming distance from "0101" to "1010" is 4; the Hamming distance from "0101" to "0111" is 1; the Hamming distance from "0101" to "0010" is 3; etc. Note that it is not the total number of "1"s or "0"s that is counted. Rather, it is the total number of different bits at the same bit location within the vector that is counted. That is, "0101" and "1010" have the same number of "1"s (2), but the Hamming distance between these two vectors is 4, as explained above.

XOR unit 220 then compares the logical address 218 (which was generated for the raw data 206 as just described) with an other logical address 222, in order to generate the Hamming distance 224 between these two logical addresses. This Hamming distance 224, along with the other logical address 222, is then sent to a retrieval unit 226. If the Hamming distance 224 is below some predetermined value/limit, then the retrieval unit 226 retrieves the other payload data 228 that is stored at the other logical address 222. In actual practice, the other payload data 228 is stored at a physical address that is associated with that other logical address 222. That is, the retrieval unit 226 is able to utilize the logical-to-physical translation unit 212 to derive the physical address that is associated with the other logical address 222. By retrieving the other payload data 228, the raw data 206 and the other payload data 228 are then associated with one another, since their closely related logical addresses indicate that other payload data 228 and the raw data 206 both describe a same type of event, activity, condition, etc.

As described in FIG. 2, two payload data are associated with one another if their respective logical addresses are within some predetermined Hamming distance to each other.

That is, the two logical addresses need not be the exact same logical address. Rather, just being "similar" is enough to associate their respective payloads together. The reason for this is due to a combination of unique properties held by logical addresses that are over a certain number of bits (e.g., between 1,000 and 10,000 bits in length) and statistical probability.

For example, consider two logical addresses that are each 1,000 bits long. Out of these 1,000 bits, only a small percentage of the bit (e.g., 4 bits out of the 1,000) are "significant bits". The term "significant bits" is defined as those bits at specific bit locations in a logical address that provide a description, such as metadata, that describes a feature of the event represented by the payload data stored at that logical address. For example, in the logical address vector 302a shown in FIG. 3, the "1" bits found in bit locations 2, 4, 6, 8 of logical address vector 302a are the "significant bits" that describe what the payload data 303 shown in the memory vector 301 in FIG. 3 represents. Thus, the other four bits in the bit locations 1, 3, 5, 7 are "insignificant", since they have nothing to do with describing the payload data 303. If the logical address vector 302a was 1,000 bits long, instead of just 8 bits long, then the 996 bits in the rest of the logical address vector would be insignificant. Thus, two logical addresses could both describe a same type of payload data, even if the Hamming distance between them was very large.

In order to filter out logical addresses that are unrelated, different approaches can be used. One approach is to simply mask in only those addresses that contain the "significant bits". This allows a precise collection of related data, but is relatively slow.

Another approach to determining which logical addresses are actually related is to develop a cutoff value for the Hamming distance based on historical experience. This historical experience is used to examine past collections of data, from which the Hamming distance between every pair of logical addresses (which were generated by the hashing logic 208 shown in FIG. 2) is used to determine where the "break point" is. For example, assume that this historical analysis shows that logical address pairs (who use 1,000 bit addresses) that are within a Hamming distance of 10 contain the same type of data 99.99% of the time; logical address pairs that are within a Hamming distance of 50 contain the same type of data 95% of the time; and logical address pairs that are within a Hamming distance of 500 contain the same type of data 80% of the time. Based on the level of precision required, the appropriate Hamming distance is then selected for future data collection/association.

Once the cutoff value for the Hamming distance between two logical addresses is determined (using statistics, historical experience, etc.), the probability that two logical addresses are actually related can be fine-tuned using a Baysean probability formula. For example, assume that A represents the event that two logical addresses both contain the same significant bits that describe a same attribute of payload data stored at the two logical addresses, and B represents the event that the Hamming distance between two logical addresses is less than a predetermined number (of bit differences), as predetermined using past experience, etc. This results in the Baysean probability formula of:

$$P(A\mid B) = \frac{P(B\mid A)P(A)}{P(B)}$$

where:
P(A|B) is the probability that two logical addresses both contain the same significant bits that describe a same attribute of payload data stored at the two logical addresses (A) given that (I) the Hamming distance between two logical addresses is less than a predetermined number (B);

P(B|A) is the probability that the Hamming distance between two logical addresses is less than a predetermined number given that (I) the two logical addresses both contain the same significant bits that describe a same attribute of payload data stored at the two logical addresses;

P(A) is the probability that two logical addresses both contain the same significant bits that describe a same attribute of payload data stored at the two logical addresses regardless of any other information; and P(B) is the probability that the Hamming distance between two logical addresses is less than a predetermined number regardless of any other information.

For example, assume that either brute force number crunching (i.e., examining thousands/millions of logical addresses) and/or statistical analysis (e.g., using a cumulative distribution formula, a continuous distribution formula, a stochastic distribution statistical formula, etc.) has revealed that there is a 95% probability that two logical addresses that are less than 500 Hamming bits apart will contain the same significant bits (i.e., (P(B|A)=0.95). Assume also that similar brute force number crunching and/or statistical analysis reveals that in a large sample, there is a 99.99% probability that at least two logical addresses will both contain the same significant bits regardless of any other information (i.e., P(A) =0.9999). Finally, assume that similar brute force number crunching and/or statistical analysis reveals that two particular logical addresses are less than 500 bits apart regardless of any other information (i.e., P(B)=0.98). In this scenario, the probability that two logical addresses both contain the same significant bits, which describe a same attribute of payload data stored at the two logical addresses given that that the Hamming distance between two logical addresses is less than a predetermined number (i.e., P(A|B)) is 97%:

$$P(A\mid B) = \frac{.95 * .9999}{.98} = .97$$

However, assume now that such brute force number crunching and/or statistical analysis reveals that there is only an 80% probability that two logical addresses that are less than 500 Hamming bits apart will contain the same significant bits (i.e., (P(B|A)=0.80). Assuming all other values remain the same (i.e., P(A)=0.9999 and P(B)=0.98), then probability that two logical addresses both contain the same significant bits, which describe a same attribute of payload data stored at the two logical addresses given that that the Hamming distance between two logical addresses is less than a predetermined number (i.e., P(A|B)), is now 81%:

$$P(A\mid B) = \frac{.80 * .9999}{.98} = .81$$

Note the following features of this analysis. First, due to the large number of data entries (i.e., thousands or millions or more), use cases and/or statistical analyses show that the probability that two logical addresses will both contain the same significant bits is high (e.g., 99.99%). Second, due to random matching (i.e., two bits randomly matching) combined with controlled matching (i.e., two bits match since they both describe a same attribute of the payload data), the probability that any two logical addresses are less than 500 bits apart is also high (e.g., 98%). However, because of these factors, P(A) is higher than P(B); thus P(A|B) will be higher than P(B|A).

Figure 4:
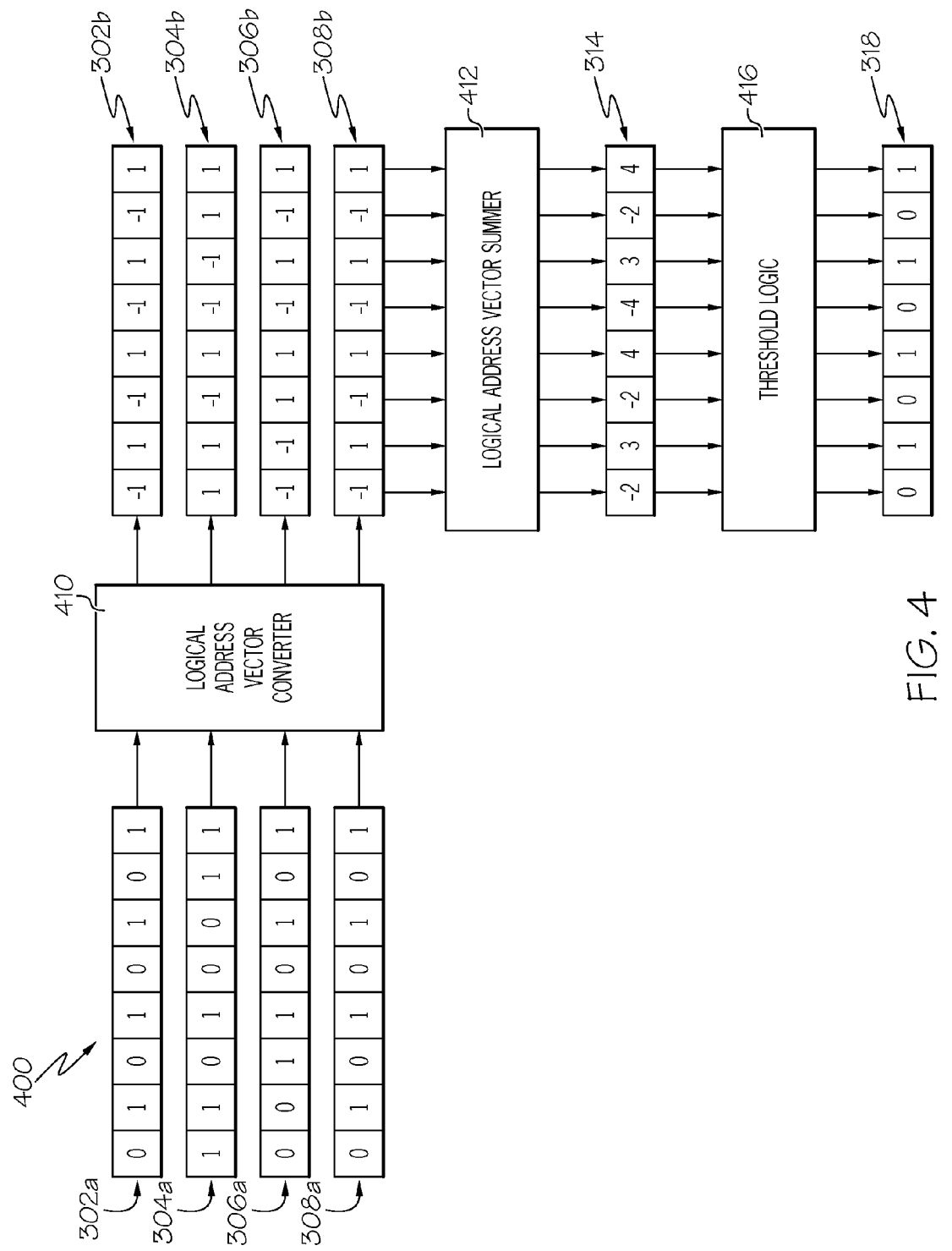
FIG. 4 depicts an exemplary system in which sets of logical addresses are evaluated to determine their relativity, according to one embodiment of the present invention.

With reference now to FIG. 4, in one embodiment, a determination is made that logical addresses from a particular set are or are not all related based on their summed logical addresses. For example, consider the system 400 shown in FIG. 4, in which sets of logical addresses are evaluated to determine their relativity (i.e., whether or not they all provide a logical address that describes related payload data). That is, logical addresses 302a-308a are logical addresses (that have been generated by the hashing procedure described above) for different payload data (not shown). In order to sum and compare these logical addresses, they are all first run though a logical address vector converter 410, which flips each "0" in the original logical addresses to a "−1", as depicted in converted logical addresses 302b-308b. These converted logical addresses 302b-308b are then summed in a logical address vector summer 412, which produces the summed address vector 314. Summed address vector 314 is a sum of each bit in each particular bit location in each of the converted logical addresses 302b-308b. For example, the first bit position in the converted logical addresses 302b-308b contains the values "−1", "+1", "−1" and "−1", which add up to "−2".

The summed address vector 314 is then run through a threshold logic 416, which compares each bit location sum to a threshold. In the example shown, this threshold states that any summed bit location that is positive is deemed to be a "1", while any summed bit location that is negative is deemed to be a "0", and any summed bit location that is zero is deemed to be either "0" or "1" (with a 50:50 chance of which one it is). As depicted, this threshold results in an evaluated logical address vector 318 of "01010101", which is the same as logical address 302a. If logical address 302a is the benchmark address (i.e., is the logical address that other addresses need to match in order to be hold the same type of payload data as logical address 302a), then matching 318 to 302a reveals that the set of logical addresses made up of 302b-308b all contain payload data that are "close enough" to that stored at logical address 302a. That is, even though logical addresses 304a and 306a are not exactly like logical address 302a (and thus may describe slightly different payload data), they are part of the same set of logical addresses 302a-308a (i.e., evaluated logical address vector 318 matches logical address 302a), and thus are deemed to have payload data that is related the payload data that is stored at logical address 302a. This assumption may be based on several factors. First, the misaligned bit positions (i.e., those that have different bit values) may or may not be significant. Second, even if the misaligned bit positions are all significant, they may not describe a particular characteristic that is important to a particular analysis. For example, a bit may simply describe a color of a product being sold, which is insignificant to a financial analysis of sales at a particular store. Third, even if the bits are significant at all requisite levels, the fact that enough (½ in the example shown in FIG. 4) of the address vectors match up perfectly may be enough to provide a meaningful group of logical addresses (i.e., there are enough exactly matching logical addresses in the group to provide a significant group, which can be utilized for some other purposes such as trend analysis, etc.)

Figure 5:
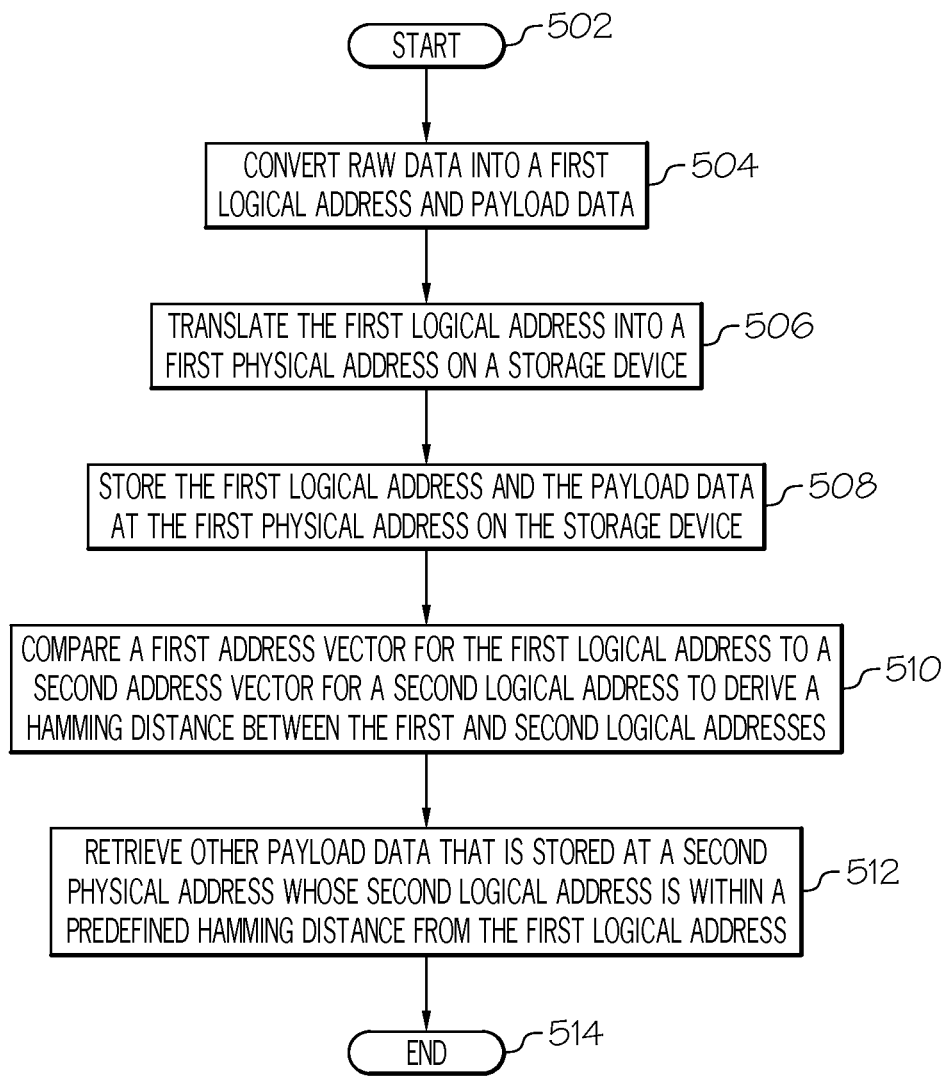
FIG. 5 is a high-level flow chart of one or more steps performed by one or more processors to retrieve and analyze stored data, according to one embodiment of the present invention.

With reference now to FIG. 5, a high-level flow chart of one or more steps performed by one or more processors to retrieve and analyze stored data, according to one embodiment of the present invention, is presented. After initiator block 502, a hashing logic converts raw data into a first logical address and payload data (block 504). As described herein, the first logical address describes metadata about the payload data stored at that address. That is, the metadata (i.e., data about data) describes what the payload data context is, where it came from, what it describes, when it was generated, etc.

As described in block 506, a hardware translation unit then translates the first logical address into a physical address on a storage device, thus enabling a hardware load/storage unit to store the first logical address (which describes the payload data) and the payload data itself at the physical address on the storage device (block 508).

As described in block 510, a hardware exclusive OR (XOR) unit then compares a first address vector (i.e., a string of characters used as an address) for the first logical address to a second address vector for a second logical address to derive a Hamming distance between the two logical addresses. This comparison enables a hardware retrieval unit to retrieve other payload data that is stored at the physical address whose second logical address is within a predefined Hamming distance from the first logical address, as described in block 512. Note that this predefined Hamming distance between the first logical address and the second logical address was derived by the hardware XOR unit.

The process ends at terminator block 514.

As depicted in FIG. 4, in one embodiment the process further comprises converting, by an address vector converter, each zero bit in a set of address vectors that describe a set of physical addresses to a negative one bit to generate a set of converted address vectors. An address vector summer then sums each bit position from the set of address vectors to generate a summation address vector. A threshold logic then compares the summation address vector to the first physical address, where a group of physical addresses whose summed address vector matches the first physical address is determined to address a storage location of a same class of payload data.

In one embodiment, the process depicted in FIG. 4 uses the hardware XOR unit to generate a Hamming distance between the first logical address and all logical addresses within the group of logical addresses whose summed address vector matches the first logical address. This enables the hardware retrieval unit to retrieve other payload data, stored within the group of physical addresses that correspond to the group of logical addresses whose summed address vector matches the first logical address, that are stored at a physical address whose corresponding logical address is within the predefined Hamming distance from the first logical address.

In various embodiments of the present invention, the payload data contains data about various events, including, but not limited to, a quantitative description of commercial transactions (e.g., how many units are sold); a qualitative description of commercial transactions (e.g., how much the units cost, what color of units were sold, etc.); an entity (e.g., a medical patient, such that the payload data describes the medical condition of the patient based on laboratory results, etc.); etc.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A system comprising:
    a hashing logic, wherein the hashing logic executes instructions to convert raw data into a first logical address and payload data, wherein the first logical address describes metadata about the payload data;
    a hardware translation unit, wherein the hardware translation unit executes instructions to translate the first logical address into a first physical address on a storage device;
    a hardware load/storage unit, wherein the hardware load/storage unit stores the first logical address and the payload data at the first physical address on the storage device;
    a hardware exclusive OR (XOR) unit, wherein the hardware XOR unit compares two logical address vectors to derive a Hamming distance between the two logical address vectors;
    a hardware retrieval unit, wherein the hardware retrieval unit retrieves other payload data that is stored at a second physical address whose second logical address is within a predefined Hamming distance from the first logical address, and wherein a Hamming distance between the first logical address and the second logical address is derived by the hardware XOR unit;
    an address vector converter, wherein the address vector converter is hardware that converts each "zero" bit in an address vector to a "negative one" bit to generate a converted address vector;
    an address vector summer, wherein the address vector summer is hardware that sums each bit position from two or more address vectors to generate a summation address vector; and
    a threshold logic, wherein the threshold logic compares the summation address vector to the first logical address, wherein a group of logical addresses whose summation address vector matches the first logical address is determined to address a storage location of a same class of payload data.

2. The system of claim 1, wherein the hardware XOR unit generates a Hamming distance between the first logical address and all logical addresses within the group of logical addresses whose summation address vector matches the first logical address, and wherein the hardware retrieval unit retrieves other payload data that are stored within a group of physical addresses that correspond to the group of logical addresses whose summation address vector matches the first logical address.

3. The system of claim 1, wherein the payload data quantitatively describes a commercial transaction.

4. The system of claim 1, wherein the payload data qualitatively describes a commercial transaction.

5. The system of claim 1, wherein the payload data qualitatively describes an entity.

6. The system of claim 1, wherein the hashing logic comprises one or more processors executing the instructions to convert the raw data into the first logical address and the payload data.

7. The system of claim 1, wherein the hardware translation logic, the hardware load/storage unit, the hardware XOR unit, and the hardware retrieval unit are all on a single silicon chip.

8. A method for analyzing stored data, the method comprising:
    converting, by a hashing logic, raw data into a first logical address and payload data, wherein the first logical address describes metadata about the payload data;
    translating, by a hardware translation unit, the first logical address into a first physical address on a storage device;
    storing, by a hardware load/storage unit, the first logical address and the payload data at the first physical address on the storage device;
    comparing, by a hardware exclusive OR (XOR) unit, a first address vector for the first logical address to a second address vector for a second logical address to derive a Hamming distance between the first and second logical addresses;
    retrieving, by a hardware retrieval unit, other payload data that is stored at a second physical address whose second logical address is within a predefined Hamming distance from the first logical address, wherein a Hamming distance between the first logical address and the second logical address is derived by the hardware XOR unit;

converting, by an address vector converter, each "zero" bit in an address vector to a "negative one" bit to generate a converted address vector;

summing, by an address vector summer, each bit position from two or more address vectors to generate a summation address vector; and comparing, by a threshold logic, the summation address vector to the first logical address, wherein a group of logical addresses whose summation address vector matches the first logical address is determined to address a storage location of a same class of payload data.

9. The method of claim 8, wherein the hardware XOR unit generates a Hamming distance between the first logical address and all logical addresses within the group of logical addresses whose summation address vector matches the first logical address, and wherein the hardware retrieval unit retrieves other payload data that are stored within a group of physical addresses that correspond to the group of logical addresses whose summation address vector matches the first logical address.

10. The method of claim 8, wherein the payload data quantitatively describes a commercial transaction.

11. The method of claim 8, wherein the payload data qualitatively describes a commercial transaction.

12. The method of claim 8, wherein the payload data qualitatively describes an entity.

13. The method of claim 8, wherein the hashing logic comprises one or more processors executing the instructions to convert the raw data into the first logical address and the payload data.

14. A computer program product for analyzing stored data, the computer program product comprising:

a non-transitory computer readable storage medium;

first program instructions to convert raw data into a first logical address and payload data, wherein the first logical address describes metadata about the payload data;

second program instructions to translate the first logical address into a first physical address on a storage device;

third program instructions to store the first logical address and the payload data at the first physical address on the storage device;

fourth program instructions to compare a first address vector for the first logical address to a second address vector for a second logical address to derive a Hamming distance between the first and second logical addresses;

fifth program instructions to retrieve other payload data that is stored at a second physical address whose second logical address is within a predefined Hamming distance from the first logical address, wherein a Hamming distance between the first logical address and the second logical address is derived by the hardware XOR unit;

sixth program instructions to convert each "zero" bit in an address vector to a "negative one" bit to generate a converted address vector;

seventh program instructions to sum each bit position from two or more address vectors to generate a summation address vector; and eighth program instructions to compare the summation address vector to the first logical address, wherein a group of logical addresses whose summation address vector matches the first logical address is determined to address a storage location of a same class of payload data; and wherein the first, second, third, fourth, fifth, sixth, seventh, and eighth program instructions are stored on the non-transitory computer readable storage medium.

15. The computer program product of claim 14, wherein the hardware XOR unit generates a Hamming distance between the first logical address and all logical addresses within the group of logical addresses whose summation address vector matches the first logical address, and wherein the hardware retrieval unit retrieves other payload data that are stored within a group of physical addresses that correspond to the group of logical addresses whose summation address vector matches the first logical address.

16. The computer program product of claim 14, wherein the payload data quantitatively describes a commercial transaction.

17. The computer program product of claim 14, wherein the payload data qualitatively describes a commercial transaction.

* * * * *